US012641104B2

(12) United States Patent
Yang et al.

(10) Patent No.: US 12,641,104 B2
(45) Date of Patent: May 26, 2026

(54) DETECTING OUTLIERS IN MULTIMODAL DISTRIBUTIONS USING EMPIRICAL CUMULATIVE DISTRIBUTION FUNCTIONS

(71) Applicant: eBay Inc., San Jose, CA (US)

(72) Inventors: Kaixi Yang, Belfast (GB); Marc Patterson, Belfast (GB); Paul Miller, Belfast (GB); Jesus Martinez-del-Rincon, Belfast (GB)

(73) Assignee: eBay Inc., San Jose, CA (US)

( * ) Notice: Subject to any disclaimer, the term of this patent is extended or adjusted under 35 U.S.C. 154(b) by 79 days.

(21) Appl. No.: 18/652,151

(22) Filed: May 1, 2024

(65) Prior Publication Data

US 2025/0088523 A1    Mar. 13, 2025

Related U.S. Application Data

(60) Provisional application No. 63/537,296, filed on Sep. 8, 2023.

(51) Int. Cl.
| | |
|---|---|
| *H04L 9/40* | (2022.01) |
| *G06F 8/65* | (2018.01) |
| *G06F 21/57* | (2013.01) |

(52) U.S. Cl.
CPC ............ *H04L 63/1425* (2013.01); *G06F 8/65* (2013.01)

(58) Field of Classification Search
CPC ............................... H04L 63/1425; G06F 8/65
See application file for complete search history.

(56) References Cited

U.S. PATENT DOCUMENTS

| | | | |
|---|---|---|---|
| 10,230,740 B2 * | 3/2019 | Beatty ..................... | H04L 67/10 |
| 10,733,594 B1 * | 8/2020 | Dai Zovi ............ | H04L 63/1425 |

(Continued)

FOREIGN PATENT DOCUMENTS

WO    WO-2020219220 A1    10/2020

OTHER PUBLICATIONS

Pan et al., "Anomalous Update Identification Based on Cosine Similarity for Collaborative Wind Power Forecasting," 2023 IEEE/IAS Industrial and Commercial Power System Asia (I&CPS Asia) Year: 2023 | Conference Paper | Publisher: IEEE.*

(Continued)

*Primary Examiner* — Roderick Tolentino
(74) *Attorney, Agent, or Firm* — Shook Hardy & Bacon L.L.P.

(57)    ABSTRACT

A method for detecting an anomaly is provided. The method receives and organizes data as a function of a plurality of time periods and a number of updates for each time period of the plurality of time periods. The organized data approximates first and second unimodalities. The first and second unimodalities have respective first and second peaks. The method identifies a dip across the plurality of time periods and determines a density of the dip. The density is compared with a predetermined threshold in order to determine if the dip is an alternative modality. A unimodality analysis is then performed on the first and second unimodalities in response to the dip being an alternative modality. The method also determines whether the second unimodality is an anomaly based on the unimodality analysis and discards the updates associated with the second unimodality when the second unimodality is an anomaly.

20 Claims, 6 Drawing Sheets

(56) References Cited

U.S. PATENT DOCUMENTS

| | | | | |
|---|---|---|---|---|
| 2002/0100036 | A1* | 7/2002 | Moshir | G06F 8/62 |
| | | | | 717/173 |
| 2015/0161394 | A1 | 6/2015 | Ferragut et al. | |
| 2016/0162519 | A1* | 6/2016 | Stowe | E21B 47/135 |
| | | | | 707/755 |
| 2018/0139188 | A1* | 5/2018 | Iyer | G06F 21/6209 |
| 2022/0405397 | A1* | 12/2022 | Golan | G06F 21/57 |
| 2023/0017989 | A1* | 1/2023 | Shi | G06F 21/566 |
| 2023/0244754 | A1 | 8/2023 | Schell | |
| 2023/0367932 | A1* | 11/2023 | Haile | G06F 17/18 |
| 2023/0385091 | A1* | 11/2023 | Ramaswamy | G06F 8/65 |
| 2024/0338704 | A1* | 10/2024 | Kallas | G06N 20/00 |
| 2025/0028516 | A1* | 1/2025 | Parandehgheibi | G06F 8/65 |

OTHER PUBLICATIONS

Weib et al., "Continuous Analysis and Optimization of Vehicle Software Updates using the Intelligent Digital Twin," 2023 IEEE 28th International Conference on Emerging Technologies and Factory Automation (ETFA) Year: 2023 | Conference Paper | Publisher: IEEE.*

"Cumulative Distribution Function", [Online]. Retrieved from the Internet: <URL:https://en.wikipedia.org/wiki/Cumulative distribution function#cite note-Kunl1Park-2,>, (Mar. 15, 2023), 10 pgs.

"Elbow method (clustering)", [Online]. Retrieved from the Internet: <https://en.wikipedia.org/wiki/Elbow_method_(clustering)>, (Oct. 7, 2022), 3 pgs.

"Empirical distribution function", [Online]. Retrieved from the Internet: <URL: https://en.wikipedia.org/wiki/Empirical distribution function>, (Oct. 7, 2022), 4 pgs.

"European Application Serial No. 24198291.7, Extended European Search Report mailed Jan. 30, 2025", 10 pgs.

"Multimodal distribution—Wikipedia", [Online] Retrieved from the internet: <https//en.wikipedia.org/wiki/Multimodal distribution, (Oct. 6, 2022), 18 pgs.

"Simpson's rule", [Online]. Retrieved from the Internet: <URL: https://en.wikipedia.org/wiki/Simpson%27s rule>, (Oct. 7, 2022), 13 pgs.

"Sklearn.manifold.TSNE—scikit-learn 1.1.2 documentation", [Online]. Retrieved from the Internet: <URL: https://scikit-learn.org/stable/modules/generated/sklearn.manifold.TSNE.html>, (accessed Oct. 7, 2022), 7 pgs.

Aggarwal, C, et al., "An Introduction to Outlier Analysis", In Outlier analysis Springer, (2017), 34 pgs.

Akoglu, Leman, "Anomaly Mining—Past, Present and Future", Proceedings of the 30th ACM International Conference on information & Knowledge Management, (May 31, 2021), 3 pgs.

An, Peng, et al., "Ensemble unsupervised autoencoders and Gaussian mixture model for cyberattack detection", Information Processing & Management, 59(2), (2022), 13 pgs.

Bhandari, Pritha, et al., "Type I & Type II Errors | Differences, Examples, Visualizations", [Online]. Retrieved from the Internet: <URL:https://www.scribbr.com/statistics/type-i-and-type-ii-errors/#:~:text=In%20statistics%2C%20a%20Type%20I%20error%20means%20rejecting%20the%20null.hypothesis%20when%20it's%20actually%20false>, (Jan. 18, 2021), 15 pgs.

Boukerche, Azzedine, et al., "Outlier Detection: Methods, Models, and Classification", ACM Computing Surveys (CSUR), 53(3), (2020), 38 pgs.

Breunig, Markus M, et al., "LOF: Identifying Density-Based Local Outliers", In Proceedings of the 2000 ACM: SIGMOD international conference on Management of data, pp. 93-104, (2022), 12 pgs.

Chamalis, Theofilos, et al., "The Projected Dip-means Clustering Algorithm", In Proceedings of the 10th Hellenic Conference on Artificial Intelligence, 7 pgs.

Chen, Jinghui, et al., "Outlier detection with autoencoder ensembles", In Proceedings of the 2017 SIAM international conference on data mining (pp. 90-98). Society for Industrial and Applied Mathematics, pp. 90-98, (Jun. 2017), 9 pgs.

Goldstein, M, et al., "Histogram-based outlier score (hbos): A fast unsupervised anomaly detection algorithm", KI—2012: poster and demo track., 9, (2012), 5 pgs.

Gomez-De-Mariscal, Estibaliz, et al., "Use of the p-values as a size-dependent function to address practical differences when analyzing large datasets", Sci Rep 11, (2021), 13 pgs.

Guo, Gongde, et al., "KNN model-based approach in classification", In OTM: Confederated International Conferences on the Mo\•e to Meaningful Internet Systems, (pp. 986-996), (2003), 12 pgs.

Hartigan, J A, et al., "The dip test of unimodality", The annals of Statistics, pp. 70-84, (1985), 15 pgs.

He, Zengyou, et al., "Discovering cluster based local outliers", Pattern recognition letters, 24(9-10), pp. 1641-1650, (2003), 13 pgs.

Hong, Xin, et al., "Component-Based Feature Saliency for Clustering", IEEE Transactions on Knowledge and Data Engineering, 33(3), (Aug. 22, 2019), 16 pgs.

Kang, Young Jin, et al., "Development of Hartigan's Dip Statistic with Bimodality Coefficient to Assess Multimodality of Distributions", Mathematical Problems in Engineering, (2019), 17 pgs.

Kriegel, Hans-Peter, et al., "LoOP: local outlier probabilities", In Proceedings of the 18th ACM conference on Information and knowledge management, (Nov. 2009), pp. 1649-1652.

Lazarevic, Aleksandar, et al., "Feature bagging for outlier detection", In Proceedings of the eleventh ACM SIGKDD international conference on Knowledge discovery in data mining, (Aug. 2005), pp. 157-166.

Leiber, Collin, et al., "The DipEncoder: Enforcing Multimodality in Autoencoders", In Proceedings of the 28th ACM SIGKDD Conference on Knowledge Discovery and Data Mining, (2022), 11 pgs.

Li, Z, et al., "Ecod: Unsupervised outlier detection using empirical cumulative distribution functions", IEEE Transactions on Knowledge and Data Engineering, (Aug. 25, 2022), 13 pgs.

Liu, Fei Tony, et al., "Isolation Forest", 8th IEEE Intl. Conference on Data Mining, (pp. 413-422), (2008), 10 pgs.

Liu, Yezheng, et al., "Generative adversarial active learning for unsupervised outlier detection", IEEE Transactions on Knowledge and Data Engineering, 32(8), pp. 1517-1528, (2019), 13 pgs.

Lucas, H., et al., "Too big to fail: large samples and the p-value problem", Information Systems Research, 24(4), (2013), 12 pgs.

M., Pavlidou, et al., "Kernel density outlier detector", In Topics in Nonparametric Statistics Springer, 10 pgs.

Maurus, Samuel, et al., "Skinny-dip: clustering in a sea of noise", In Proceedings of the 22nd ACM SIGKDD international conference on Knowledge discovery and data mining, (pp. 1055-1064), (2016), 10 pgs.

Nadim, Abrar Hayat, et al., "Analysis of machine learning techniques for credit card fraud detection", In 2019 International Conference on Machine Learning and Data Enginttring (iCMLDE), IEEE, pp. 42-47, (2019), 6 pgs.

Pang, G., et al., "Deep Learning for Anomaly Detection: A Review", ACM Computing Surveys (CSUR), 54(2), (2021), 39 pgs.

Pang, Guansong, et al., "Toward deep supervised anomaly detection: Reinforcement learning from partially labeled anomaly data", In Proceedings of the 27th ACM SIGKDD conference on knowledge discovery & data mining, (Aug. 14-18, 2021), 1298-1308.

Papadimitriou, S., et al., "Loci: Fast outlier detection using the local correlation integral", In Proceedings 19th international conference on data engineering (Cat. No. 03CH37405) IEEE., (Mar. 2003), 29 pgs.

Park, Kun Il, "Fundamentals of Probability and Stochastic Processes with Applications to Communications", Springer. ISBN 978-3-319-68074-3, (2018), 277 pgs.

Pevny, Tomas, et al., "Lightweight on-line detector of anomalies", Machine Learning, 2016, 102(2), pp. 275-304, (Jul. 21, 2015), 30 pgs.

Pokrajac, D., et al., "Incremental local outlier detection for data streams", In 2007 IEEE symposium on computational intelligence and data mining, (Mar. 2007), 12 pgs.

Pokrajac, Dragoljub, et al., "Incremental connectivity-based outlier factor algorithm", In Visions of Computer Science—BCS International Academic Conference, (2008), 13 pgs.

(56)     References Cited

OTHER PUBLICATIONS

Satman, Mehmet Hakan, "A New Algorithm for Detecting Outliers in Linear Regression", International Journal of statistics and Probability, 2(3), (Jul. 15, 2013), 101-109.

Shyu, Mei-Ling, et al., "A Novel Anomaly Detection Scheme Based on Principal Component Classifier", (2003), 9 pgs.

Siffer, Alban, et al., "Are your data gathered?", Computational Biology and Bioinformatics, ACM, 2 Penn Plaza, Suite 701New YorkNY10121-0701USA, (Jul. 19, 2018), 2210-2218.

Silverman, B W, "Using kernel density estimates to investigate multimodality", Journal of the Royal Statistical Society: Series B (Methodological), 43(1), pp. 97-99, (1981), 4 pgs.

Tsou, Yu-Lin, et al., "Robust distributed anomaly detection using optimal weighted one-class random forests", In 2018 IEEE International Conference on Data Mining (ICDM), IEEE, (2018), 6 pgs.

Wong, Weng Keen, et al., "Bayesian network anomaly pattern detection for disease outbreaks", In Proceedings of the 20th International Conference on Machine Learning (ICML-03), (2003), 8 pgs.

Yang, Xingwei, et al., "Outlier detection with globally optimal exemplar-based GMM", In Proceedings of the 2009 SIAM International Conference on Data Mining, Society for Industrial and Applied Mathematics, pp. 145-154, (Apr. 2009), 10 pgs.

Zhang, Chidong, et al., "Bimodality in tropical water vapour", Quarterly Journal of the Royal Meteorological Society: A journal of the atmospheric sciences, applied meteorology and physical oceanography, 129(594), (2003), 20 pgs.

Zhao, Y, et al., "SUOD: toward scalable unsupervised outlier detection", arXiv preprint arXiv:2002.03222, (Feb. 8, 2020), 8 pgs.

Zhao, Yue, et al., "Automatic unsupervised outlier model selection", Advances in Neural Information Processing Systems, 34, pp. 4489-4502, (2021), 14 pgs.

Zhao, Yue, et al., "TOD: GPU-accelerated Outlier Detection via Tensor Operations", arXiv preprint arXiv:2110.14007, (Sep. 17, 2022), 18 pgs.

Zong, Bo, et al., "Deep Autoencoding Gaussian Mixture Model for Unsupervised Anomaly Detection", In International conference on learning representations, (2018), 19 pgs.

* cited by examiner

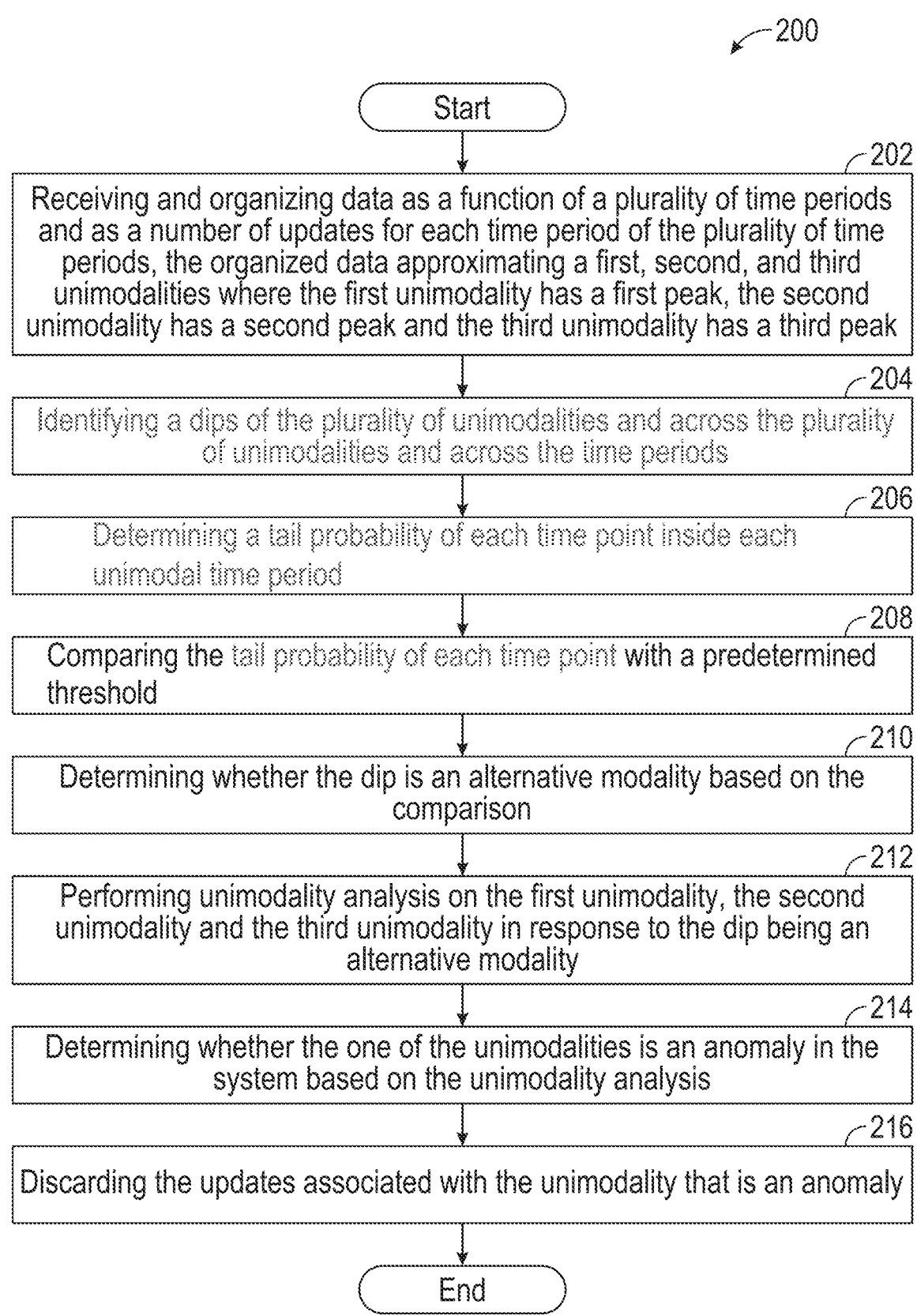

—200

Start

202

Receiving and organizing data as a function of a plurality of time periods and as a number of updates for each time period of the plurality of time periods, the organized data approximating a first, second, and third unimodalities where the first unimodality has a first peak, the second unimodality has a second peak and the third unimodality has a third peak

204

Identifying a dips of the plurality of unimodalities and across the plurality of unimodalities and across the time periods

206

Determining a tail probability of each time point inside each unimodal time period

208

Comparing the tail probability of each time point with a predetermined threshold

210

Determining whether the dip is an alternative modality based on the comparison

212

Performing unimodality analysis on the first unimodality, the second unimodality and the third unimodality in response to the dip being an alternative modality

214

Determining whether the one of the unimodalities is an anomaly in the system based on the unimodality analysis

216

Discarding the updates associated with the unimodality that is an anomaly

End

FIG. 2

DETECTING OUTLIERS IN MULTIMODAL DISTRIBUTIONS USING EMPIRICAL CUMULATIVE DISTRIBUTION FUNCTIONS

CLAIM OF PRIORITY

This Application claims the benefit of priority of U.S. Provisional Application Ser. No. 63/537,296, filed Sep. 8, 2023, which is hereby incorporated by reference in its entirety.

TECHNICAL FIELD

Examples of the present disclosure relate generally to systems for detecting potential malicious attacks on a computing system and, more particularly, but not by way of limitation, to systems for verifying computing system updates.

BACKGROUND

Typically, when developers develop software applications, software code used to run software applications can be stored at a developer platform. In addition to storing code used to run software applications, the developer platform can be used to track and control changes made to the software code. Version control can be used to track and manage code changes.

When code changes are submitted to the developer platform by a first user, a second user can review the code changes and determine if the code changes are appropriate. Moreover, when code changes are submitted, the code changes can include metadata associated with the code changes. The metadata can reflect when the code changes were submitted to the developer platform, who made the code changes, and the scope of the code changes.

Often times, patterns can emerge when code changes are submitted at the developer platform. For example, if developers typically work core hours between 9 am and 3 pm, code changes can generally be submitted to the developer platform during these working hours. However, code changes may be submitted outside of these core hours, such as at 4 am. When code changes are submitted at an anomalous time, this can be indicative of a malicious code change.

BRIEF DESCRIPTION OF THE DRAWINGS

Various ones of the appended drawings merely illustrate examples of the present disclosure and should not be considered as limiting its scope.

FIG. 2 is a method for preventing malicious attacks on the server device and the developer platform in FIG. 1, according to some examples.

DETAILED DESCRIPTION

Figure 1:
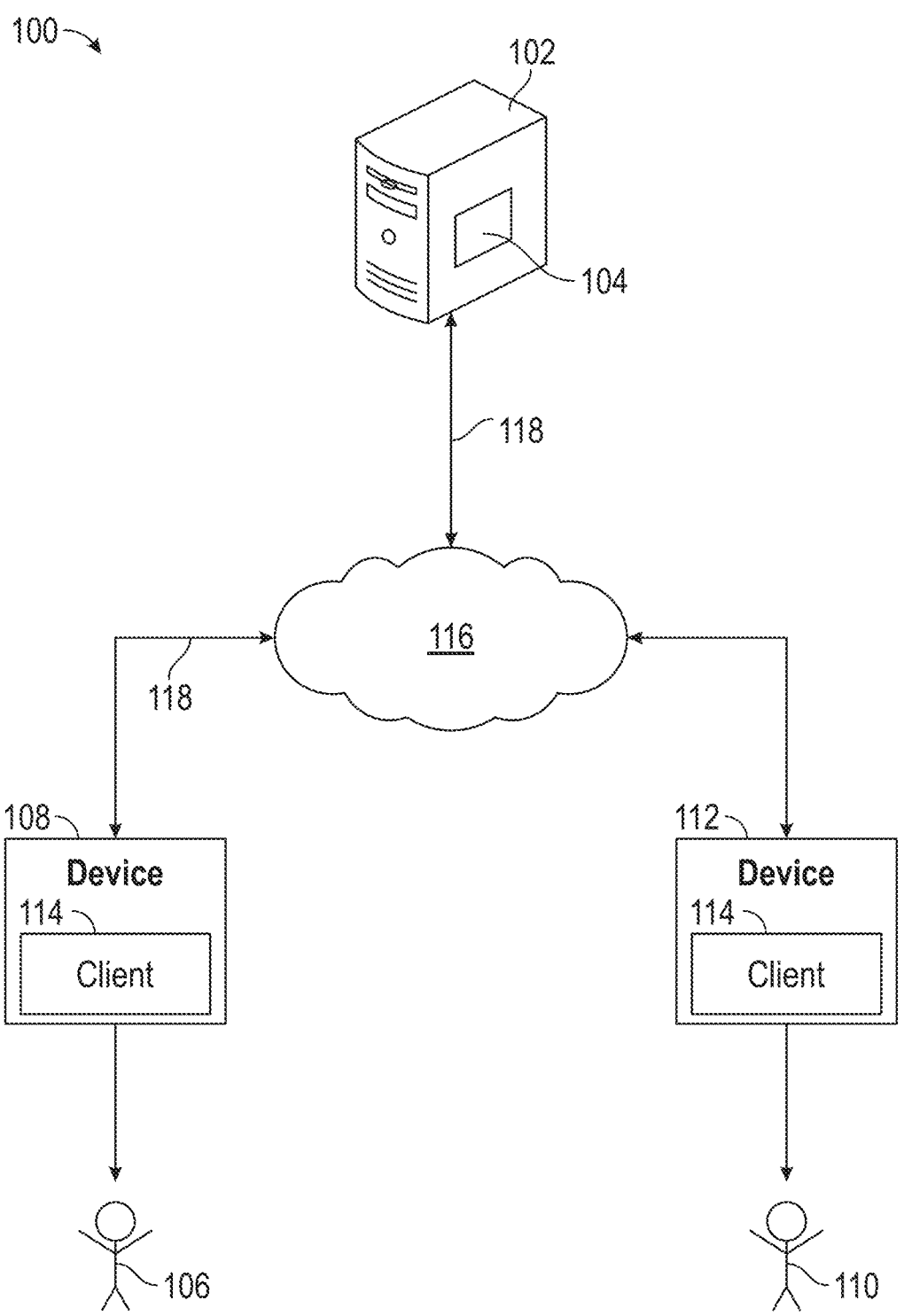
FIG. 1 is a network diagram illustrating a network environment suitable for preventing malicious attacks on a server device and a developer platform, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Examples relate to preventing malicious attacks on a computing system. Specifically, a method and system can maintain security of the computing system by determining when system updates are in fact malicious attacks. This determination can be made by determining when received updates peak over a given time period. A score is assigned to densities associated with each peak. Each of the scores are compared to a threshold and, based on the comparison, a determination is made if a malicious attack corresponds to one of the peaks.

Data relating to updates can be received during a plurality of time periods. The data can include metadata that includes the entity submitting the update, the time and day when the update was received, an author of the updates, and an update type. The data can be organized as a function of a plurality of time periods and a number of updates for each time period of the plurality of time periods. In examples, the organized data can approximate first and second unimodalities across first time periods and second time periods of the plurality of time periods.

The unimodalities can correspond to updates that are received over a time period. When a number of received updates increases with time, this can correlate to a positive slope for unimodality. When the number of updates decreases with time, this can correlate to a negative slope for the unimodality. A transition point where the positive slope becomes a negative slope, i.e., when the number of received updates begins to decline, can be defined as a peak of the unimodality. Thus, a peak of each unimodality of the plurality of unimodalities can be defined by a peak number of updates received at a particular time period of the plurality of time periods. For example, a first peak of the first unimodality can be at a first peak time period during the first time period and a second peak of the second unimodality can be at a second peak time period during the second time period.

In addition, an alternative modality, referred to hereinafter as a dip or a potential dip, can be identified at a third time period between the first and second unimodalities based on a number of updates received at the dip. The potential dip can be identified based on when the negative slope becomes a positive slope, i.e., a number of received updates begins to increase after decreasing. Furthermore, the dip can be identified when the slope is zero after a negative slope, which can correlate to when the number of updates being received remains constant, i.e., the number does not change for a given time period.

Densities can be calculated for each of the unimodalities and the potential dip. A logarithmic function can be applied to the densities to confirm that the potential dip is an actual dip and that the updates associated with each of the unimodalities correspond to legitimate updates that are not malicious.

If a score of the potential dip is greater than a threshold, then the potential dip can be an actual dip. Moreover, if any of the scores of the unimodalities are above the threshold, then the ones of the unimodalities having a score above the threshold can be considered malicious. Specifically, the updates received in the unimodal having the high score may in reality be a malicious update. If one of the first or second unimodalities are determined to be a malicious update, the malicious update can be discarded.

FIG. 1 is a network diagram illustrating a network environment 100 suitable for maintaining the security of a server device 102 and a developer platform 104. The server device 102 can receive updates, such as software updates, that are to be implemented by the developer platform 104. The developer platform 104 can be a platform that allows users to create, store, manage, and share code. When an update, such as an update to code, is received from a first user 106 and a device 108, the update can be stored at the developer platform 104. A second user 110 can review the update at a device 112 and either have the update implemented or make a decision to not implement the update.

The devices 108 and 112 can be any computing device suitable for use by a user. For example, the devices 108 and 112 can be a desktop computer, a tablet computer, a portable media device, or a smart phone belonging to a user. The devices 108 and 112 can interact with the server device 102 using a client 114. The client 114 can be a web browser, which allows for communication between a device, such as the devices 108 and 112, with the server device 102 and the developer platform 104. The client 114 can be an application client that can be a standalone application that can run on one or both of the devices 108 and 112 and communicates with server device 102 to employ the services on the remote server, such as a Bluetooth™ client application, or the like via a network.

The network 116 can be any network that enables communication between or among machines, databases, and devices (e.g., the devices 108 and 112). Accordingly, the network 116 can be a wired network, a wireless network (e.g., a mobile or cellular network), or any suitable combination thereof. The network 116 can include one or more portions that constitute a private network, a public network (e.g., the Internet), or any suitable combination thereof.

Examples relate to maintaining the security of the server device 102 and the developer platform 104. More specifically, malicious attacks can occur at the server device 102 and the developer platform 104. The malicious attacks can be in the form of seemingly innocuous software updates that are received at the server device 102 and the developer platform 104. However, seemingly innocuous software updates can be received at times that are traditionally not associated with receiving updates.

To further illustrate, entities may work between the hours of 7:00 am and 7:00 pm. Thus, when entities submit updates to the server device 102 and the developer platform 104, these would typically occur between the hours of 7:00 am and 7:00 pm, with peaks occurring at various times. When these updates are received, entities can access these updates and implement the updates as necessary. However, seemingly innocuous updates, which are in fact malicious attacks, may be received during off-hours, such as at 3:00 am. When entities access these seemingly innocuous updates, the malicious attacks may be released on the server device 102 and the developer platform 104. Examples prevent these potentially malicious attacks and maintain the security of the server device 102 and the developer platform 104 by analyzing modalities associated with a time period within which the different updates are received, determining that seemingly innocuous updates may be malicious based on a distribution of the updates received, such as a number of number updates received, and then discarding the updates if a likelihood exists that the seemingly innocuous updates may actually be malicious.

In examples, an empirical cumulative distribution function (ECDF) can be used to calculate a cumulative distribution function (CDF). First and second unimodalities can occupy areas on a distribution. The first and second unimodalities can have densities corresponding to a number of COMMITS, which can relate to updates, that have been received during a time interval associated with each of the first and second unimodalities. A CDF can be calculated to confirm that fewer COMMITS have been received in time intervals that are different from the time intervals associated with the first and second unimodalities.

In order to calculate the CDF, the following equation can be used:

$$F_x(x) = P(X \leq x) \qquad \text{Equation (1)}$$

Here, $P(X \leq x)$ provides the probability that a continuous random variable is less than or equal to a specific value. It accumulates the probabilities of all values up to a certain point. X is the variable of interest and x is the certain point.

The CDF can be a step function that can increase by $1/n$ at each datum of n data points. The ECDF can be used to estimate the CDF for the points designated by x. In particular, the ECDF can be used to calculate probability densities associated with each datum. The ECDF can be defined by the following:

$$F(x) = \sum_{i=1}^{n} w_i F_i(x)$$

Here, $w_i F_i(x)$ can relate to the combination of individual distributions $F_i(x)$ (or components) and their associated weight $w_i$.

As mentioned above, examples implement a detection method, such as Dip-empirical cumulative distribution functions for outlier detection (ECOD) to generalize anomaly detection to multimodal datasets. An assumption can be made that outlier peaks, such as the unimodal peaks mentioned above, can be rare events where the updates can occur in low-density regions of probability distribution. ECOD can use information about the distribution of the updates to determine where updates are less likely and thus have a higher probability of being outliers and potentially being malicious attacks instead of updates. ECOD can be used to estimate a ECDF for a potential dip. When the ECDF is calculated for a potential dip, a logarithmic function can be applied to the ECDF to determine if the potential dip is an actual dip. Furthermore, ECOD can estimate a ECDF for each variable in a unimodal peak that occurs at a time that is unexpected, such as at 3:00 am. ECOD can be used to calculate an outlier score for a potential dip or a unimodal peak that occurs at an unusual time. ECOD can calculate the score by computing a tail probability for each variable associated with the potential dip or the unimodal peak that occurs at the unusual time. ECOD can then multiply them together, where a logarithmic function can then be applied to generate a score.

Now making reference to FIG. 2, a method 200 for preventing malicious attacks on a computing system is shown. Initially, during an operation 202 data that can relate to updates can be received. The received data can be organized according to multidimensional parameters. In particular, a first parameter can include a plurality of data instances and a second parameter can include a plurality of time periods. The data can be organized as a function of each parameter of the multidimensional parameters where a first parameter of the multidimensional parameters can be mapped against a second parameter of the multidimensional parameters. In the example of a number of data instances and the time period, the data can be organized such that a number of data instances of the plurality of data instances can be mapped against a time period of the plurality of time periods. When the data is organized during the operation 202, the organized data can approximate a first unimodality, a second unimodality, and a third unimodality. Each of the first, second, and third unimodalities can respectively have first, second, and third peaks, where the first, second, and third peaks can be defined according to positive and negative slopes, as described above.

Figure 3:
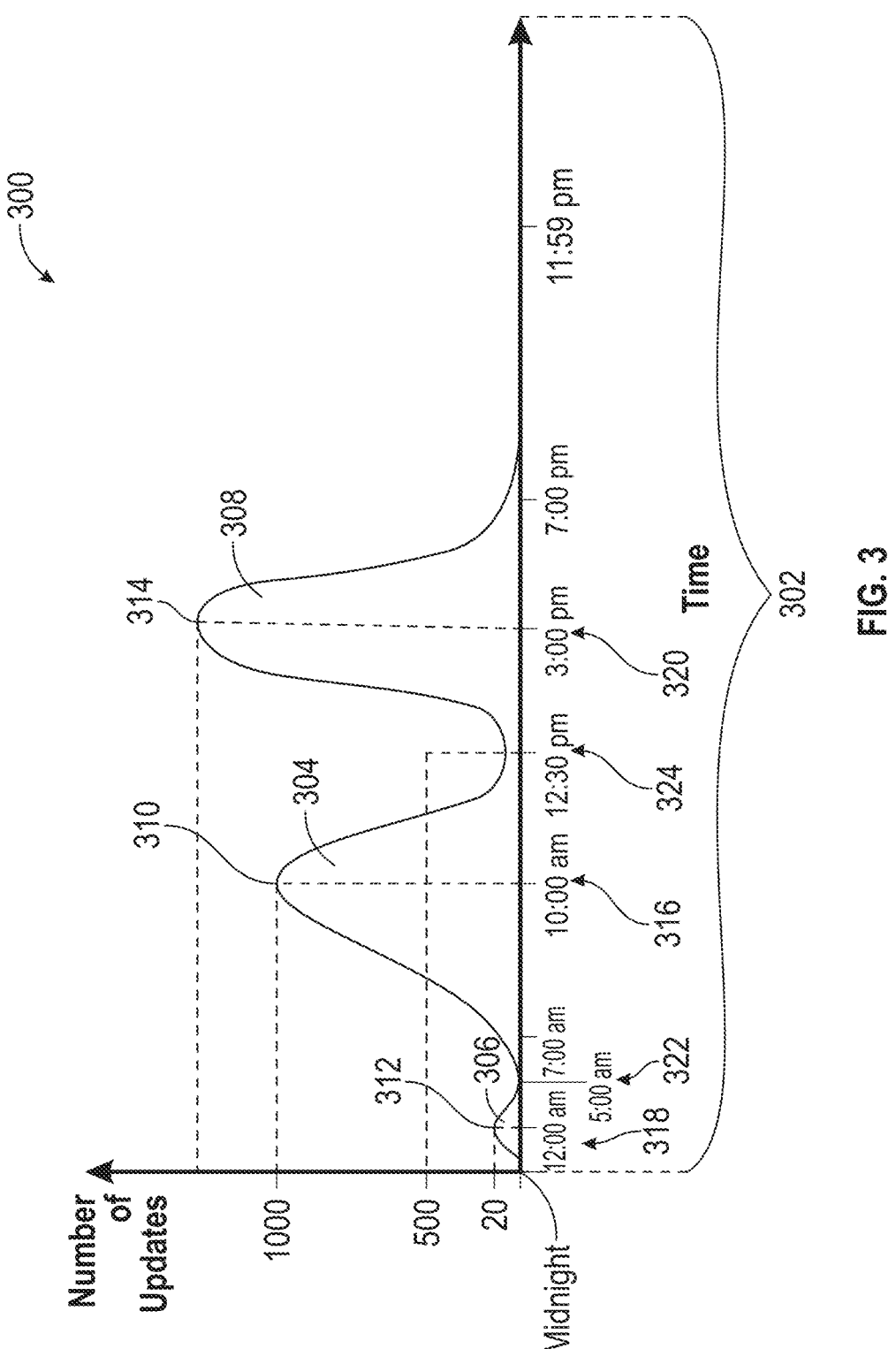
FIG. 3 illustrates received data that is organized as a function of a number of updates over time, where the received data has first, second, and third unimodalities each having first, second, and third peaks, according to some examples.

As an example of the method 200 and referred to herein as "the illustration," reference is made to FIG. 3, which illustrates organized data 300 corresponding to data received at the server device 102 and the developer platform 104 during the operation 202. The illustration can relate to a scenario where individuals are providing updates to the developer platform 104. The developer platform 104 can determine whether or not the updates are valid using the method 200. The developer platform 104 can receive data 118 and then organize the data 118 into the organized data 300 during the operation 202. The developer platform 104 can also organize the data 118 as a function of a plurality of time periods 302 along a time axis as discussed above during the operation 202. The organized data 302 can approximate a first unimodality 304, a second unimodality 306, and a third unimodality 308. In the illustration, the first unimodality 304 can have a first peak 310 and the second unimodality can have a second peak 312 while the third unimodality 308 can have a third peak 314.

Each of the peaks 310-314 can be associated with a peak number of updates that are received at a time period of the plurality of time periods. The first peak 310 can occur at a first time period 316, which can correspond to 10:00 am. The second peak 312 can occur at a second time period 318, which can correspond to 12:00 am. Moreover, the third peak 314 can occur at a third time period 320, which can correspond to 3:00 pm. The first peak 310 and the third peak 314 can occur at recurring time periods, i.e., 10:00 am and 3:00 pm, that are typically associated with receiving new updates. Additionally, the second peak 312 can occur at a time that is typically after, or before, the recurring time periods.

Returning attention to FIG. 2, after the data is received and organized during the operation 202, the method can perform an operation 204, where a potential dip can be identified across the plurality of unimodalities and across the plurality of time periods. In a first example, component splitting can used to identify a dip. In a second example, a dip can be identified by determining a mid-point between the peaks of unimodalities.

When calculating slopes is used to identify a dip, modal intervals outside slopes of unimodalities that are next to one another can be identified. The slopes can include the steepest slopes of the unimodalities. The slopes can be identified by checking a modality of a left portion of an unimodality and a right portion of the unimodality that is next to the unimodality for which the left portion is checked. The dip can be inferred from the identified modal intervals. A middle point can be identified between the slope of the left portion and the slope of the right portion. The middle point can correspond to the point where a negative slope of the left portion of an unimodality transitions to a positive slope of the right portion of another unimodality. While a left side and an adjoining right side are described, the inverse can also be used, i.e., a right side and an adjoining left side.

When using the mid-point example, a mid-point between peaks of adjacent unimodalities can be determined. The mid-point can be a half-way point between the first unimodality peak and the second unimodality peak. Thus, if the peak of a first unimodality is at 9:00 am and the peak of a second unimodality is at 3:00 pm, the midpoint can be noon, which is the half-way point between 9:00 am and 3:00 pm. Thus, the potential dip can be identified as an extension of the first unimodality and an extension of the second unimodality where the extensions can culminate at the midpoint.

In the illustration, during the operation 204, a mid-point 322 can be identified between the first peak 310 and the second peak 312. The first peak 310 occurs at the first time period 316, which corresponds to the time of 10:00 am. The second peak 312 occurs at the second time period 318, which corresponds to the time of 12:00 am. Therefore, the mid-point 322 can correspond to 5:00 am.

Still sticking with the illustration, during the operation 204, a mid-point 324 can be identified between the first peak 310 and the third peak 314. The first time period 316 corresponds to the time of 10:00 am while the third peak 314 occurs at the second time period 320, which corresponds to the time of 3:00 pm. As such, the mid-point 322 can correspond to 12:30 pm. In the illustration, each of the mid-points 322 and 324 can be identified as potential dips.

Once a potential dip is identified during the operation 204, an operation 206 can be performed, where the tail probability of each data point can be determined. The tail probability of each data point be identified using an estimated cumulative distribution function (ECDF). An estimate of an underlying cumulative distribution function can be estimated based on observed data. In instances where the observed data relates to updates that are provided to a developer platform in a given unimodality, the distribution estimator can relate to estimating the number of updates that have been received in the given unimodality. Various data clustering techniques, such as vector quantization, can be used along with various nonparametric methods in addition to a cumulative distribution function, such as kernel density estimation, to determine the densities for each of the unimodalities and the potential dip.

After the density of the potential dip is determined in the operation 206, the density can be compared to a predetermined threshold during an operation 208. The comparison can be performed in order to determine if a data point is an anomaly in operation 210. In order to perform the comparison, a logarithmic function can be applied against the density, which can result in a score for the data point. The score can be compared against a predetermined threshold. The predetermined threshold can correspond to a value where a score that is above the value can be indicative of the anomalous of a data point. If a score is below the value, then the data point is not an anomaly.

Figure 4:
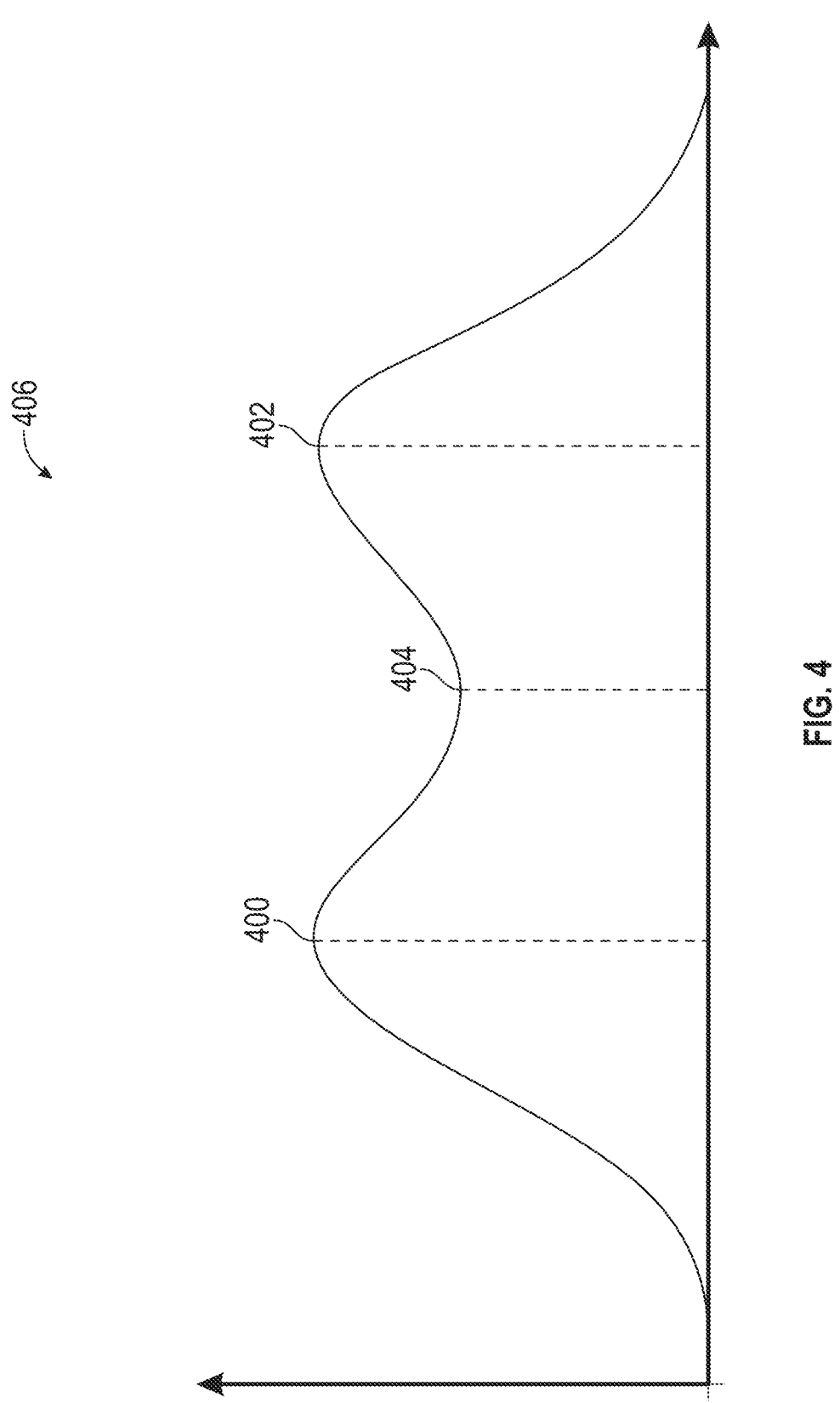
FIG. 4 shows unimodal for updates that are received during a plurality of time periods that initially appears as a plurality of unimodalities, according to some examples.

When a potential dip is not identified as an alternative modality, then the unimodalities that are adjacent the potential dip are not separate unimodalities that define a multi-modal distribution. Instead, the adjacent unimodalities are in fact a single unimodality. To further illustrate and referred to herein as the "unimodality illustration," reference is made to FIG. 4.

In the unimodality illustration, a modality can include peaks 400 and 402 along with a potential dip 404. A density of the potential dip 404 is calculated using the techniques described above and then a logarithmic function is applied to the calculated density. The resulting score is compared against a predetermined threshold. In the unimodality illustration, the score is below the threshold. Thus, the potential dip is not an alternative modality. Furthermore, the peaks 400 and 402 do not define individual unimodalities. Instead, the peaks 400 and 402 along with the potential dip 404 are part of a single unimodality 406.

Returning to the illustration and FIG. 3, since the mid-points 322 and 324 were identified as potential dips, during the operation 206, densities associated with the mid-points 322 and 324 can be determined. A logarithmic function can then be applied to the determined densities to obtain respective scores and, during the operation 208, the respective scores are compared with a predetermined threshold. In the illustration, a determination is made that the respective scores are above the predetermined threshold. Thus, the dips associated with the mid-points 322 and 324 are determined to be alternative modalities during the operation 210.

After a determination is made that a dip is an alternative modality, an operation 212 can be performed where a unimodality analysis is performed on the first, second, and third unimodalities. When an alternative modality is determined, an assumption can be made that the data received is multi-modal as opposed to unimodal. Therefore, a unimodality analysis can be performed for each of the unimodalities instead of performing a single unimodality analysis for all the received data. Moreover, the unimodality analysis can be performed using the ECDF techniques discussed above during the operation 212. The unimodality analysis can be performed to determine a density associated with each of the unimodalities.

After the unimodality analysis is performed in the operation 212, a logarithmic function can be applied to each of the results of the unimodality analysis to generate a score for each unimodality during an operation 214. In particular, a logarithmic function can be applied to the result of the unimodality analysis performed for the first unimodality, the result of the unimodality analysis performed for the second unimodality, and the result of the unimodality analysis performed for the third unimodality. Thus, a first score for the first unimodality, a second score for the second unimo-dality, and a third score for the third unimodality can be generated.

After the scores are generated, each of the first, second, and third scores can be compared against a pre-defined threshold to determine if any of the first, second, or third unimodalities are an anomaly. An anomaly can be defined as data corresponding to a potential malicious attack. More-over, during an operation 216, those unimodalities that are identified as being an anomaly can be discarded. Discarding can include ignoring any data that was received during the time period associated with the unimodality which is to be discarded.

Turning back to the illustration, during the operation 212, a unimodality analysis is performed on each of the first unimodality 304, the second unimodality 306, and the third unimodality 308 using ECDF techniques. During the operation 214, a logarithmic function is applied to the unimodality analysis results for the first unimodality 304, the second unimodality 306, and the third unimodality 308 to generate first, second, and third scores. Moreover, during the operation 214, each of the first, second, and third scores are compared against a threshold value, where the first and third scores are below the threshold value. However, in the illustration, a determination is made that the second score, which corresponds to the second unimodality at the time 12:00 am was an anomaly. Thus, an assumption is made the updates received during the second unimodality 306 relate to a malicious attack. In particular, in the illustration, the updates received during the second unimodality 306 can be malware that, when downloaded, can lead to a security breach at the server device 102 and the developer platform 104. Therefore, during the operation 216, the updates received at the second unimodality 306 are discarded, thereby maintaining the security of the server device 102 and the developer platform 104.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 5 and 6. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, data-bases, or devices illustrated in FIG. 1 may be combined into a single machine, database, or device, and the functions described herein for any single machine, database, or device may be subdivided among multiple machines, databases, or devices.

Figure 5:
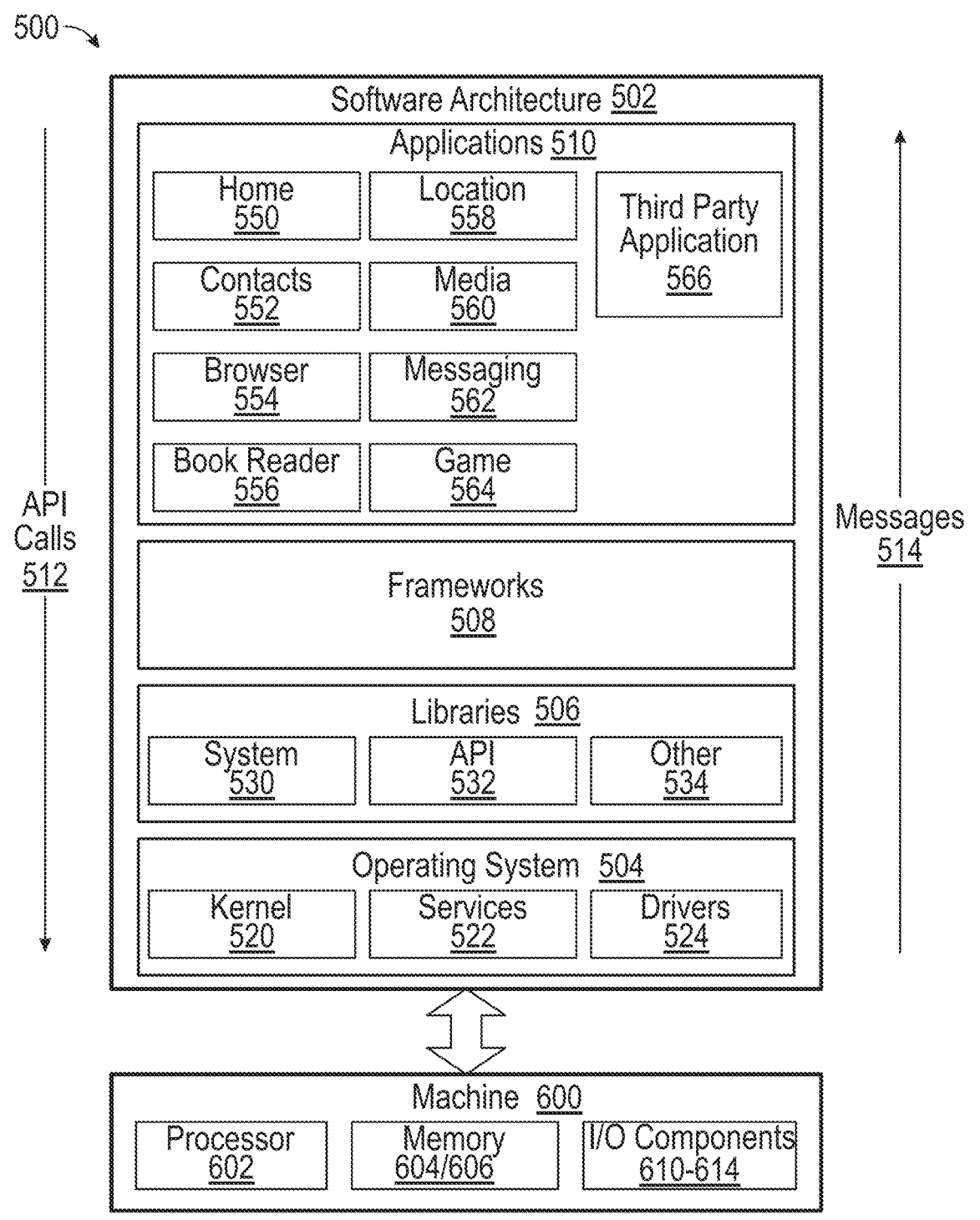
FIG. 5 is a block diagram illustrating architecture of software used to implement social network-initiated listings, according to some examples.
Figure 6:
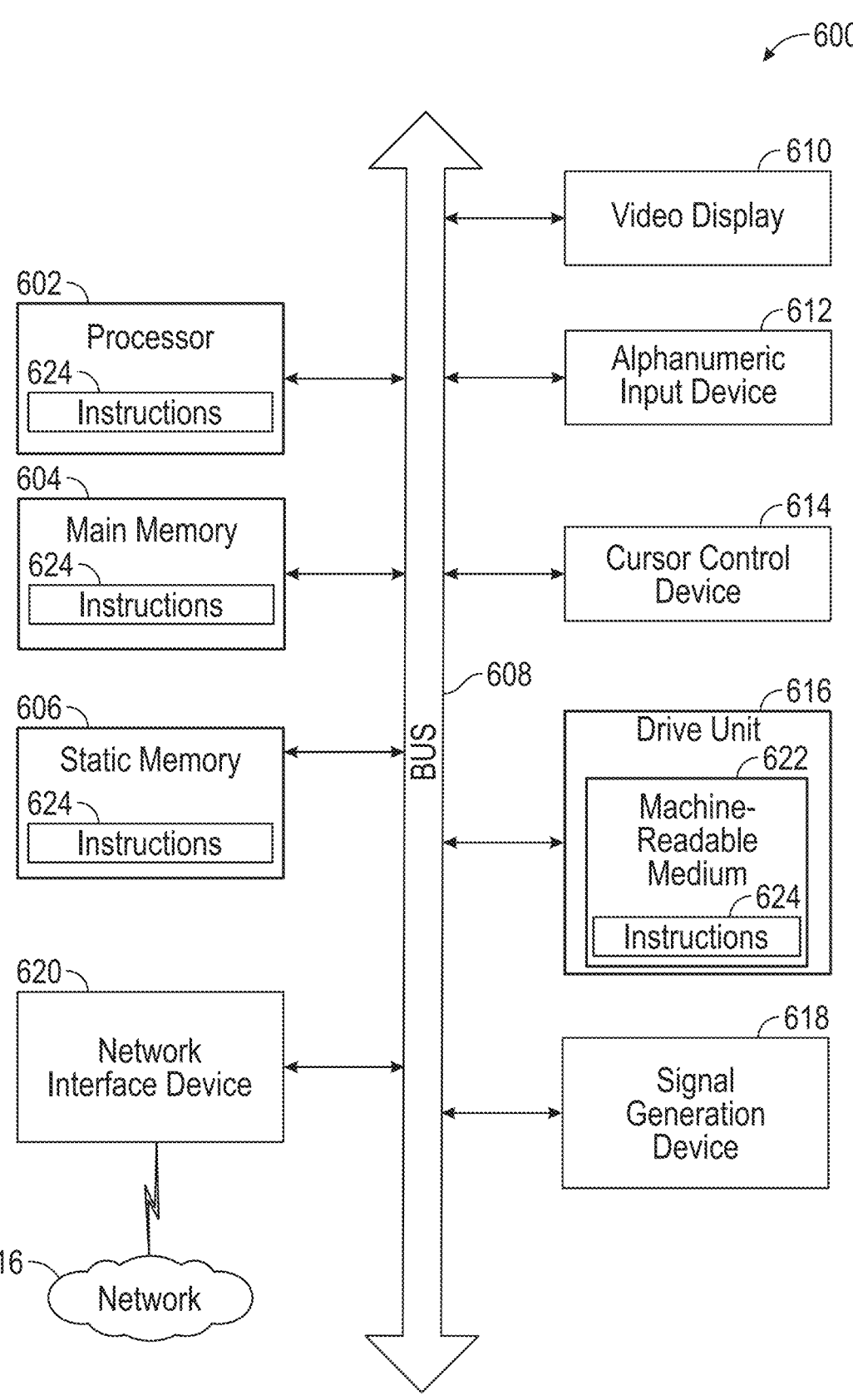
FIG. 6 shows a machine as an example computer system with instructions to cause the machine to implement social network-initiated listings, according to some examples.

FIG. 5 is a block diagram 500 illustrating a software architecture 502, which may be installed on any one or more of the devices described above. FIG. 6 is merely a non-limiting example of a software architecture, and it will be appreciated that many other architectures may be imple-mented to facilitate the functionality described herein. The software architecture 502 may be implemented by hardware such as a machine 600 of FIG. 6 that includes a processor 602, memory 604 and 606, and I/O components 610-614. In this example, the software architecture 502 may be concep-tualized as a stack of layers where each layer may provide a particular functionality. For example, the software archi-tecture 502 includes layers such as an operating system 504, libraries 506, frameworks 508, and applications 510. Opera-tionally, the applications 510 invoke application program-ming interface (API) calls 512 through the software stack and receive messages 514 in response to the API calls 512, according to some implementations.

In various implementations, the operating system 504 manages hardware resources and provides common ser-vices. The operating system 504 includes, for example, a kernel 520, services 522, and drivers 524. The kernel 520 acts as an abstraction layer between the hardware and the other software layers in some implementations. For example, the kernel 520 provides memory management, processor management (e.g., scheduling), component management, networking, and security settings, among other functionality. The services 522 may provide other common services for the other software layers. The drivers 524 may be responsible for controlling or interfacing with the underlying hardware. For instance, the drivers 524 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 506 provide a low-level common infrastructure that may be utilized by the applications 510. The libraries 506 may include system libraries 530 (e.g., C standard library) that may provide functions such as memory allocation functions, string manipulation functions, mathematic functions, and the like. In addition, the libraries 506 may include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 506 may also include a wide variety of other libraries 534 to provide many other APIs to the applications 510.

The frameworks 508 provide a high-level common infrastructure that may be utilized by the applications 510, according to some implementations. For example, the frameworks 508 provide various graphic user interface (GUI) functions, high-level resource management, high-level location services, and so forth. The frameworks 508 may provide a broad spectrum of other APIs that may be utilized by the applications 510, some of which may be specific to a particular operating system or platform.

In an example, the applications 510 include a home application 550, a contacts application 552, a browser application 554, a book reader application 556, a location application 558, a media application 560, a messaging application 562, a game application 564, and a broad assortment of other applications such as a third-party application 566. According to some examples, the applications 510 are programs that execute functions defined in the programs. Various programming languages may be employed to create one or more of the applications 510, structured in a variety of manners, such as object-orientated programming languages (e.g., Objective-C, Java, or C++) or procedural programming languages (e.g., C or assembly language). In a specific example, the third-party application 566 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 566 may invoke the API calls 512 provided by the mobile operating system (e.g., the operating system 504) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via the network 108 (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

FIG. 6 is a block diagram of a machine within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device (cursor control device) 1614 (e.g., a mouse), a disk drive unit 616, a signal generation device 618 (e.g., a speaker) and a network interface device 620.

The drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. Instructions 624 may also reside within the static memory 606.

While the machine-readable medium 622 is shown in an example to be a single medium, the term "machine-readable medium" may include a single medium or multiple media (e.g., a centralized or distributed database, and/or associated caches and servers) that store the one or more instructions or data instructions 624. The term "machine-readable medium" shall also be taken to include any tangible medium that is capable of storing, encoding or carrying instructions 624 for execution by the machine and that cause the machine to perform any one or more of the methodologies of the present invention, or that is capable of storing, encoding or carrying data structures utilized by or associated with such instructions 624. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 624 may further be transmitted or received over the network 116 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding or carrying instructions 624 for execution by the machine, and includes digital or analog communications signals or other intangible media to facilitate communication of such software.

In various example examples, one or more portions of the network 116 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 116 or a portion of the network 116 may include a wireless or cellular network, and the coupling 682 may be a Code Division Multiple Access (CDMA) connection, a Global System for Mobile communications (GSM) connection, or another type of cellular or wireless coupling. In this example, a coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology. Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A method for detecting an anomaly in a system, the method comprising:

receiving data comprising software updates received over time;

generating, based on the data, organized data as a function of:

a plurality of time periods; and a number of the software updates received for each time period of the plurality of time periods, the organized data comprising a first unimodality having a first peak in the number of the software updates and a second unimodality having a second peak in the number of the software updates;

identifying a dip between the first peak and the second peak;

determining a density of the dip;

comparing the density of the dip with a predetermined threshold;

determining whether the dip is an alternative modality based on the comparing of the density of the dip with the predetermined threshold;

performing unimodality analysis on the first unimodality and the second unimodality in response to the dip being an alternative modality;

determining whether any of the first unimodality or the second unimodality is an anomaly in the number of the software updates received based on the unimodality analysis; and discarding the software updates associated with the anomaly in the number of the software updates received.

2. The method of claim 1, wherein the first unimodality is across first time periods of the plurality of time periods, the second unimodality is across second time periods of the plurality of time periods, and the dip is across third time periods of the plurality of time periods where the first peak is defined by a first peak number of updates received at a first peak time period of the first time periods and the second peak is defined by a second peak number of updates received at a second peak time period of the second time periods.

3. The method of claim 2, wherein the third time periods are between the first time periods and the second time periods and identifying the dip includes identifying an extension of the first unimodality across the first time periods and an extension of the second unimodality across the second time periods.

4. The method of claim 2, wherein the organized data approximates a fourth unimodality across fourth time periods of the plurality of time periods, the fourth unimodality having a fourth peak defined by a fourth peak number of updates received at a fourth time period of the fourth time periods.

5. The method of claim 4, the method further comprising:
determining a density of a fourth number of updates at the fourth unimodality;
performing a unimodality analysis on the fourth unimodality; and
determining to perform the first number of updates and the fourth number of updates based on performing the unimodality analysis on the first unimodality and the fourth unimodality.

6. The method of claim 2, wherein the received data includes metadata associated with the number of the software updates, the metadata for each software update including:
a date and time indicating when the software update was received; and
an author of the software update.

7. The method of claim 6, wherein the first time periods occur during recurring time periods associated with receiving new updates and the second time periods occur after the recurring time periods.

8. The method of claim 1, further comprising:
calculating a first density of first software updates for the first unimodality;
calculating a second density of second software updates for the second unimodality; and
calculating a third density of third software updates at the dip;
applying a logarithmic function to each of the first density, the second density, and the third density to generate a first score, a second score, and a third score; and
determining that the dip is the alternative modality when the third score is above a predetermined threshold.

9. A non-transitory machine-readable medium having instructions embodied thereon, the instructions executable by a processor of a machine to perform operations comprising:
receiving data comprising software updates received over time;
generating, based on the data, organized data as a function of:
a plurality of time periods; and
a number of the software updates received for each time period of the plurality of time periods, the organized data comprising a first unimodality having a first peak in the number of the software updates and a second unimodality having a second peak in the number of the software updates;
identifying a dip between the first peak and the second peak;
determining a density of the dip;
comparing the density of the dip with a predetermined threshold;
determining whether the dip is an alternative modality based on the comparing the density of the dip with the predetermined threshold;
performing unimodality analysis on the first unimodality and the second unimodality in response to the dip being an alternative modality;

determining whether any of the first unimodality or the second unimodality is an anomaly in the number of software updates received based on the unimodality analysis; and
discarding the software updates associated with the anomaly in the number of the software updates received.

10. The non-transitory machine-readable medium of claim 9, wherein the first unimodality is across first time periods of the plurality of time periods, the second unimodality is across second time periods of the plurality of time periods, and the dip is across third time periods of the plurality of time periods where the first peak is defined by a first peak number of updates received at a first peak time period of the first time periods and the second peak is defined by a second peak number of updates received at a second peak time period of the second time periods.

11. The non-transitory machine-readable medium of claim 10, wherein the third time periods are between the first time periods and the second time periods and identifying the dip includes identifying an extension of the first unimodality across the first time periods and an extension of the second unimodality across the second time periods.

12. The non-transitory machine-readable medium of claim 10, wherein the organized data approximates a fourth unimodality across fourth time periods of the plurality of time periods, the fourth unimodality having a fourth peak defined by a fourth peak number of updates received at a fourth time period of the fourth time periods.

13. The non-transitory machine-readable medium of claim 12, wherein the machine further performs operations comprising:
determining that the second unimodality and the second time periods are an outlier among the plurality of time periods; and
determining if the second time periods occur before the first time periods or after the fourth time periods.

14. The non-transitory machine-readable medium of claim 10, wherein the received data includes metadata associated with the number of the software updates, the metadata for each software update including:
a date and time indicating when the software update was received; and
an author of the software update.

15. The non-transitory machine-readable medium of claim 9, wherein the machine further performs operations comprising:
calculating a first density of first software updates for the first unimodality;
calculating a second density of second software updates for the second unimodality; and
calculating a third density of third software updates at the dip;
applying a logarithmic function to each of the first density, the second density, and the third density to generate a first score, a second score, and a third score; and
determining that the dip is the alternative modality when the third score is above a predetermined threshold.

16. A device, comprising:
a processor; and
memory including instructions that, when executed by the processor, cause the device to perform operations including:
receiving data comprising software updates received over time;
generating based on the data, organized data as a function of:

a plurality of time periods; and a number of the software updates received for each time period of the plurality of time periods, the organized data comprising a first unimodality having a first peak in the number of the software updates and a second unimodality having a second peak in the number of the software updates;

identifying a dip between the first peak and the second peak;

determining a density of the dip;

comparing the density of the dip with a predetermined threshold;

determining whether the dip is an alternative modality based on the comparing of the density of the dip with the predetermined threshold;

performing unimodality analysis on the first unimodality and the second unimodality in response to the dip being an alternative modality;

determining whether any of the first unimodality or the second unimodality is an anomaly in the number of software updates received based on the unimodality analysis; and discarding the software updates associated with the anomaly in the number of the software updates received.

17. The device of claim 16, wherein the first unimodality is across first time periods of the plurality of time periods, the second unimodality is across second time periods of the plurality of time periods, and the dip is across third time periods of the plurality of time periods where the first peak is defined by a first peak number of updates received at a first peak time period of the first time periods and the second peak is defined by a second peak number of updates received at a second peak time period of the second time periods.

18. The device of claim 17, wherein the third time periods are between the first time periods and the second time periods and identifying the dip includes identifying an extension of the first unimodality across the first time periods and an extension of the second unimodality across the second time periods.

19. The device of claim 17, wherein the received data includes metadata associated with the number of the software updates, the metadata for each software update including:

a date and time indicating when the software update was received; and an author of the software update.

20. The device of claim 16, wherein the device further performs operations including:

calculating a first density of first software updates for the first unimodality;

calculating a second density of second software updates for the second unimodality; and calculating a third density of third software updates at the dip;

applying a logarithmic function to each of the first density, the second density, and the third density to generate a first score, a second score, and a third score; and determining that the dip is the alternative modality when the third score is above a predetermined threshold.

* * * * *